United States Patent [19]

Hoffman et al.

[11] Patent Number: 4,778,598

[45] Date of Patent: Oct. 18, 1988

[54] SEPARATION OF ASH FROM REGENERATED ADSORBENT

[75] Inventors: Mark C. Hoffman, Mosinee; Marvin J. Dietrich; Thomas P. Oettinger, both of Schofield, all of Wis.

[73] Assignee: Zimpro Inc., Rothschild, Wis.

[21] Appl. No.: 9,498

[22] Filed: Feb. 2, 1987

[51] Int. Cl.⁴ .............................................. B01D 21/01
[52] U.S. Cl. ................................... 210/710; 210/712; 210/713; 210/727; 210/728; 209/5
[58] Field of Search ................ 209/5; 210/712, 713, 210/727, 728, 732–736, 805, 806, 675, 694, 696–698, 710, 768–772, 803, 804, 610, 616, 673; 502/23

[56] References Cited

U.S. PATENT DOCUMENTS

| | | | |
|---|---|---|---|
| 3,808,126 | 4/1974 | Pradt | 210/63 |
| 3,876,536 | 4/1975 | Pradt et al. | 210/10 |
| 3,904,518 | 9/1975 | Hutton et al. | 210/11 |
| 4,069,148 | 1/1978 | Hutton et al. | 210/11 |
| 4,541,933 | 9/1985 | Arnold et al. | 210/780 |
| 4,555,329 | 11/1985 | Sykes et al. | 209/5 |

FOREIGN PATENT DOCUMENTS 1073365 3/1980 Canada ............................. 182/9
56-96713 8/1981 Japan.

Primary Examiner—Ivars Cintins
Attorney, Agent, or Firm—Michael, Best & Friedrich

[57] ABSTRACT

A process for separating ash particles from an aqueous slurry containing a mixture of regenerated adsorbent (e.g., carbon) and ash particles includes the steps of settling the slurry to produce a solid phase including the mixture of adsorbent and ash particles and a supernatant or a clarified aqueous phase. After separation of the aqueous phase, a slurry of the solid phase is diluted with water and a dispersing agent for promoting suspension of the ash particles and an anionic polymer for promoting settling of the adsorbent particles are added. The thus-treated, dilute slurry is settled to produce an aqueous phase containing primarily suspended ash particles and a solid phase including carbon particles. After separation, the solid phase can be returned to a wastewater treatment system.

21 Claims, 1 Drawing Sheet

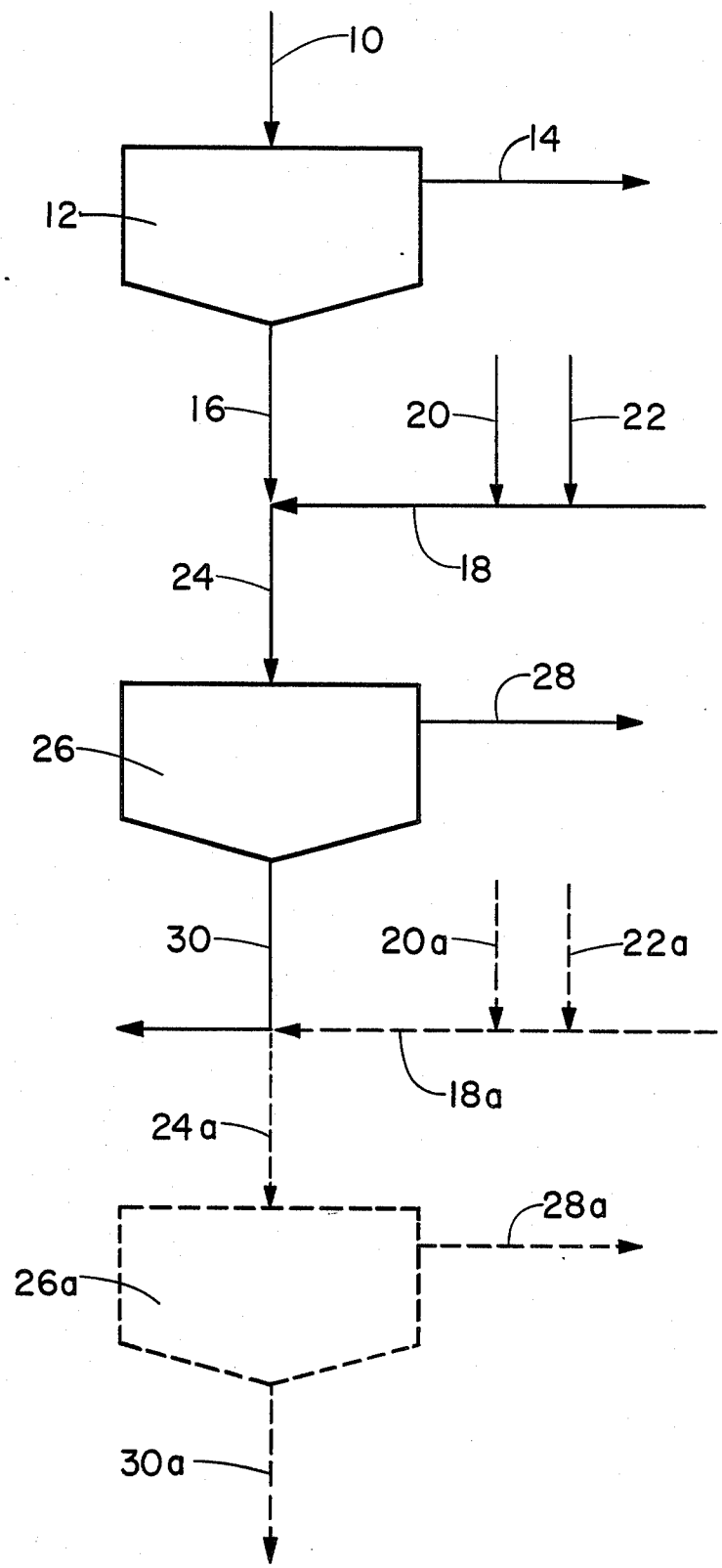

SEPARATION OF ASH FROM REGENERATED ADSORBENT

BACKGROUND OF THE INVENTION

I. Field of the Invention

This invention relates to processes for separating ash particles from regenerated adsorbent particles, such as activated carbon.

II. Description of Related Art

Powdered adsorbent materials, such as activated carbon, coke fines, diatomaceous earth, fly ash and the like, are used in wastewater treatment in a variety of ways. For instance, such materials are added to biological treatment systems to enhance performance. Powdered activated carbon is most commonly used for this purpose and in some processes is mixed with biological solids in an aeration basin. Examples of such processes are described in U. S. Pat. Nos. 3,904,518 and 4,069,148.

Once the adsorptive properties of the activated carbon are expended, it must be regenerated before it can be reused in the treatment process.

One method for regenerating carbon involves wet oxidation of the mixture of biological solids and spent carbon. Wet air oxidation at elevated temperatures and pressures destroys the volatile portion of the biological solids and oxidizes the organic substances adsorbed on the surface of the powdered carbon to restore its adsorptive capacity. The resulting regenerated carbon is recycled as part of an aqueous slurry to the treatment process Another method for regenerating carbon involves flame incineration under a controlled atmosphere, such as in a multiple hearth furnace. The hot thermally regenerated carbon and biomass residue mixture is cooled by introduction into a water quench tank. The resulting aqueous slurry of regenerated carbon is recycled to the treatment process.

The recovered aqueous slurry from either regeneration process consists primarily of reactivated carbon particles and inorganic ash particles removed from the wastewater by the carbon and formed during the regeneration process. The continued recycle of this ash along with the recovered carbon to the treatment process eventually leads to an undesirable accumulation of ash in the wastewater treatment system. Thus, there is a need to remove a portion of the ash from the regenerated carbon stream to prevent a detrimental build up of ash in the wastewater treatment system.

Pradt U.S. Pat. No. 3,808,126 discloses removing inert solids from the bottom of a wet oxidation reactor via a separate pipe and combining the inert solids stream with the reactor outflow at a point downstream in the system.

Burant et al. Canadian Pat. No. 1,073,365 discloses removing inert ash from a powdered activated carbon by classification of inert solids in a wet air oxidation reactor during carbon regeneration. The heavier inert solids are removed from the bottom of the reactor while a regenerated carbon slurry is removed from the top of the reactor and returned to the treatment system.

Pradt et al. U.S. Pat. No. 3,876,536 discloses separating ash from a regenerated carbon with a centrifical device which makes use of the difference in the specific gravity between the ash and the regenerated carbon.

Armold et al. U.S. Pat. No. 4,541,933 discloses separating ash from a wet oxidized activated sludge/powdered carbon mixture by using a plurality of hydrocyclones to concentrate the ash and then collecting the ash concentrate on a screen.

Japanese patent application No. 96713/81 discloses diluting a regenerated carbon/ash mixture with from two to ten volumes of water, and adding a dispersing agent if the total hardness is higher than 100, to suspend the ash particles and precipitate the carbon particles. The precipitated carbon is recycled to the treatment process. A cationic flocculent is added to the water suspension containing ash particles to precipitate the ash.

Sykes et al. U.S. Pat. No. 4,555,329 discloses separating inorganic gangues from coal particles in a coal refuse slurry by adding low molecular weight anionic vinyl polymers to disperse the slurry and then adding high molecular weight anionic vinyl polymers to flocculate and settle the coal particles.

All these prior processes have certain disadvantages. Classification of inert ash in a wet oxidation reactor requires additional piping and removal of the ash slurry at system pressure is extremely abrasive to control valves. Centrifical devices are costly to install and operate. Diluting the slurry from the regeneration process produces increased volumes of low strength wastewater containing inert ash which must be treated before discharge.

SUMMARY OF THE INVENTION

An object of the invention is to provide an effective and economical process for separating ash particles from a mixture of ash and regenerated adsorbent particles contained in an aqueous slurry without increasing the volume of wastewater containing ash particles.

Another object of the invention is to provide such a process which does not require classification during the regeneration process or special equipment.

Other objects, aspects, and advantages of the invention will become apparent to those skilled in the art upon reviewing the following detailed description, the drawing and the appended claims.

The process provided by the invention is effective for separating ash particles from a mixture of ash and regenerated adsorbent (e.g., activated carbon) particles contained in an aqueous slurry, particularly an aqueous slurry produced by wet oxidation or thermal regeneration of a mixed liquor sludge from a wastewater treatment system including a mixture of biological solids and spent adsorpent. The slurry is first settled to produce a clarified first aqueous phase containing about 50 to about 80% by volume of the total water in the slurry and a thickened first solids phase and these two phases are separated. Substantially clean water is added to the separated first solids phase to obtain a dilution ratio of about 2 to about 5 parts of water by volume to one part of the first solids phase. A sufficient amount of a dispersing agent to cause suspension of the ash particles and a sufficient amount of an anionic polymer to cause settling of the adsorbent particles are admixed with the diluted first solids phase. The thus-treated, dilute first solids phase is settled to produce a second aqueous phase containing primarily suspended ash particles and a settled second solids phase containing primarily adsorbent particles and these two phases are separated. The separated second solids phase can be recycled to a waste water treatment system for reuse.

In one embodiment, separation of ash is enhanced by diluting the second solids phase with substantially clean water to the same dilution ratio as above, admixing a dispersing agent and an anionic polymer with the dilute second solid phase, settling the thus-treated, dilute second solids phase to produce a third aqueous phase containing primarily suspended ash particles and a settled third solids phase containing primarily adsorbent particles. These two phases are separated, and, as above, the separated third solids phase can be recycled to a wastewater treatment system for reuse

BRIEF DESCRIPTION OF THE DRAWING

The drawing is a flow diagram illustrating preferred and alternate embodiments of the invention.

DESCRIPTION OF THE PREFERRED EMBODIMENTS

While the process of the invention can be used for other applications, it is particularly adaptable for treatment of an aqueous slurry produced by wet air oxidation or thermal regeneration of a mixed liquor sludge (a mixture of biological solids and spent activated carbon) from a wastewater treatment system and will be described in connection with that application.

Referring to the drawing, an aqueous slurry from a wet air oxidation unit containing 30–70 g/l suspended solids composed primarily of regenerated carbon and ash particles is introduced via a conduit 10 into a conventional settler-clarifier 12. In the settler-clarifier 12, a thickened, first solids phase including a mixture of regenerated carbon and ash particles settles to the bottom, leaving a clarified aqueous phase. As used herein, the term "solids phase" means a thickened, aqueous slurry produced during gravity separation or settling and containing a higher concentration of solid particles than in the slurry prior to settling.

An amount of the clarified aqueous phase comprising about 50 to about 80% by volume of the total water in the incoming aqueous slurry is withdrawn from the settler-clarifier 12 through a conduit 14. This clarified aqueous phase is commonly referred to as the regeneration supernatant and usually is substantially particle free. Thus, it can be recycled to the treatment system or discharged to waste. Removal of less than about 50% of the aqueous phase is not advantageous, while removal of more than about 80% of the aqueous phase produces a slurry which is difficult to handle by conventional treatment plant techniques.

The first solids phase is withdrawn from the settler-clarifier 12 via a conduit 16 and diluted with water introduced through a conduit 18. The water used for dilution should be substantially clean and have a hardness (combined calcium and magnesium content) of less than about 40 to 50 ppm. As used herein, the term "substantially clean" means that the water does not include contaminants which tend either to cause the ash particles to flocculate or precipitate, such as cationic polymers, organic detergents and the like, or to cause the carbon particles to remain suspended, such as organic surfactants or detergents. The dilution water does not have to be potable or deionized. It can be soft water, tap water or even an effluent from the wastewater treatment. The dispersing agent and the anionic polymer can be added to the water prior to dilution through conduits 20 and 22 as illustrated or added after dilution.

Suitable dispersing agents include sodium hexametaphosphate, sodium tripolyphosphate, sodium silicate, sodium hydroxide, EDTA, borax and mixtures thereof.

The amount of dispersing agent added is sufficient to cause the ash particles to remain in suspension. Generally, this amount is about 5 to about 500, preferably about 10 to about 100 and most preferably about 40 mg/l, based on the total volume of the dilute first solids phase.

An anionic polymer found to be particularly effective in promoting settling of carbon particles is Percol 726, marketed by Allied Colloids, Suffolk, Va. which is a high molecular weight copolymer of sodium acrylate and acrylamide. Other suitable commercially available anionic polymers include Magnifloc 835A, marketed by American Cynamide, Wayne, N.J., Hydrofloc 420, marketed by Aqua Ben Corp., Orange, Calif., WT-7736, marketed by Calgon Corp., Pittsburgh, Pa. and Hercofloc 1031, marketed by Hercules Corp., Wilmington, Del.

The amount of anionic polymer added is sufficient to cause the carbon particles to settle without substantially increasing the settling of ash particles. Generally, this amount is about 0.1 to about 4, preferably about 0.3 to about 0.5, mg/l, based on the total volume of the dilute first solids phase. Amounts of aninoic polymer greater than about 4 mg/l tend to cause both the ash and carbon particles to settle.

The treated, dilute first solids phase is introduced via a conduit 24 into another conventional settler-clarifer 26. In settler-clarifer 26, a thickened second solids phase including primarily regenerated carbon particles settles to the bottom, leaving a second aqueous phase containing primarily suspended ash particles. The second aqueous phase is withdrawn from the clarifer 26 via conduit 28 for further treatment and/or disposal. The second solids phase is withdrawn from the clarifer 26 via a conduit 30 and can be recycled to the waste water treatment system for reuse.

In an alternate embodiment illustrated by dashed lines in the drawing, removal of the ash particles is improved by diluting the second solids phase, adding a dispersing agent and an anionic polymer, and then settling the resulting treated, dilute slurry as described above. The conduits and the settler-clarifer for this alternate embodiment corresponding to those described above are represented by the same reference numeral followed with the letter "a".

In the settler-clarifier 26a, a third solids phase including primarily carbon particles settles to the bottom, leaving a third aqueous phase containing primarily suspended ash particles. The third aqueous phase is withdrawn from the settler-clarifier 26a via a conduit 28a for further treatment and/or disposal. The third solids phase is withdrawn from the clarifer 26a via a conduit 30a and can be recycled to the waste water treatment system for reuse.

Separating a clarified aqueous phase from the carbon/ash mixture prior to adding dilution water produces a number of advantages. The clarified aqueous phase or regeneration supernatant is undiluted and does not contain significant amounts of suspended ash. It is easily biodegraded, either aerobically or anaerobically, and can be returned to the treatment system without recycling excessive amounts of ash or hydraulic volume to the system.

In prior art processes wherein the slurry from a regeneration unit containing a mixture of regenerated carbon and ash is diluted for separation, the amount of dilution water required to effect separation increases as the overall hardness of the mixture increases. This results in larger amounts of an ash-containing liquid which must be treated for reuse or disposal. The smaller volume of the first solids phase produced in the process of the invention substantially reduces the volume of dilution water required to suspend the ash particles and precipitate the carbon particles. Also, the concentration of suspended particles in the second aqueous phase is substantially higher, resulting in a reduction in handling and disposal costs. Furthermore, the dilution water does not have to be clean, potable or deionized. Instead, a treatment plant effluent which is substantially clean can be used as the dilution water, resulting in additional savings.

Without further elaboration, it is believed that one skilled in the art can, using the preceding description, utilize the present invention to its fullest extent. The following examples are presented to exemplify embodiments of the invention and should not be considered as limitations thereof.

EXAMPLE 1

A mixed liquor sludge from a wastewater treatment system was subjected to wet air oxidation to produce a regenerated, powdered activated carbon/ash particle slurry. The regenerated slurry contained 13 g/l suspended solids, including 6.3 g/l ash (48.8% ash). The slurry solids settled readily on standing. Different amounts of a 50—50 by weight aqueous mixture of sodium hexametaphosphate and sodium silicate were added to separate samples of the slurry, resulting in dispersing agent concentrations of 100, 200, 400 and 1,000 mg/l. The solids remained dispersed in each sample and no settling or separation was observed. An anionic polymer (Percol 726) was added to each sample at a concentration of 1.0 mg/l and all the particles settled with no evidence of a separation of the carbon and ash particles.

The anionic polymer was added at a concentration of 0.1 mg/l to a slurry sample containing 200 mg/l of the above mixture of dispersing agents and no settling or separation of the carbon and ash particles was observed. Incremental amounts of the anionic polymer were added to this slurry sample and there was no observable change until the concentration reached 0.4 mg/l. At that concentration, all the solids settled and there was no evidence of a separation of carbon and ash particles.

From these results, it can be seen that, with the supernatant present, the addition of a dispersing agent does not produce the desired separation of ash and carbon particles, even at relatively large concentrations. Also, it can be seen that the use of an anionic polymer in combination with a dispersing agent does not produce the desired separation and, instead, causes all of the particles to settle at higher concentrations.

EXAMPLE 2

A one liter sample of the regenerated carbon slurry of Example 1 was allowed to settle. 750 ml of clear supernatant was removed by decanting and replaced by an equal volume of tap water. The dilute regenerated slurry contained 14.75 g/l suspended solids, including 7.21 g/l ash (48.9% ash). The mixture of dispersing agents described in Example 1 was added to the dilute regenerated slurry at a concentration of 200 mg/l. After mixing the solid particles remained dispersed and little settling was observed. An anionic polymer (Percol 726) was added at a concentration of 1.0 mg/l and a settled solid phase (100 ml) containing carbon particles and an aqueous phase (900 ml) containing dispersed ash particles were obtained. 875 ml of the aqueous phase was separated and replaced by an equal volume of tap water. The mixture of dispersing agents described in Example 1 was added to the dilute solids phase at a concentration of 200 mg/l to disperse the ash particles. The anionic polymer was added at a concentration of 0.5 mg/l to settle the carbon particles. This second settling produced a settled solids phase (100 ml) containing carbon particles and an aqueous phase (900 ml) containing suspended ash particles, Approximately 28% of the ash particles in the starting mixture was removed in the first settling step and another 9+% was removed in the second settling step. Approximately 95% of the carbon in the starting mixture was recovered by the first settling step and approximately 90% of the remaining carbon was recovered by the second settling step.

From these results, it can be seen that the process of the invention is capable of removing a substantial portion of the ash particles and still recovering a high percentage of the regenerated carbon particles for reuse.

From the foregoing description, one skilled in the art can easily ascertain the essential characteristics of the invention and, without departing from the spirit and scope thereof, make various changes and modifications to adapt it to various usages.

We claim:

1. A process for separating ash particles from a mixture of ash and regenerated adsorbent particles contained in an aqueous slurry comprising
   (a) settling said aqueous slurry to produce a clarified first aqueous phase containing about 50 to about 80% by volume of the total water in said aqueous slurry and a thickened first solids phase;
   (b) separating said first aqueous phase from said first solids phase;
   (c) adding substantially clean water to said separated first solids phase to obtain a dilution ratio of about 2 to about 5 parts of water by volume to one part of said first solids phase;
   (d) admixing with said dilute first solids phase a sufficient amount of a dispersing agent to cause suspension of said ash particles and a sufficient amount of an anionic polymer to cause settling of said adsorbent particles;
   (e) settling said thus-treated, dilute first solids phase to produce a second aqueous phase containing primarily suspended ash particles and a settled second solids phase containing primarily adsorbent particles; and
   (f) separating said second aqueous phase from said second solids phase.

2. A process according to claim 1 wherein said slurry is recovered from a wastewater treatment system and said second solids phase is recycled to said treatment system.

3. A process according to claim 1 wherein said slurry is recovered from a wastewater treatment system and said first aqueous phase is recycled to said treatment system.

4. A process according to claim 1 wherein said slurry is recovered from a wastewater treatment system and said water added in step (c) is an effluent from said treatment system.

5. A process according to claim 1 including
   (g) adding substantially clean water to said separated second solids phase to obtain a dilution ratio of about 2 to about 5 parts of water by volume to one part of said second solids phase;

(h) admixing with said dilute second solids phase a sufficient amount of a dispersing agent to cause suspension of said ash particles and a sufficient amount of an anionic polymer to cause settling of said adsorbent particles; and (i) settling said thus-treated, dilute second solids phase to produce a third aqueous phase containing primarily suspended ash particles and a settled third solids phase containing primarily adsorbent particles.

6. A process according to claim 5 wherein said slurry is recovered from a wastewater treatment system and said third solids phase is recycled to said treatment system.

7. A process according to claim 1 wherein the amount of said dispersing agent added in step (d) is about 5 to about 500 mg/l based on the total volume of said dilute first solids phase.

8. A process according to claim 7 wherein the amount of said dispersing agent added in step (d) is about 10 to about 100 mg/l.

9. A process according to claim 8 wherein the amount of said dispersing agent added in step (d) is about 40 mg/l.

10. A process according to claim 1 wherein the amount of said anionic polymer added to step (d) is about 0.1 to about 4 mg/l, based on the total volume of said diluted first solids phase.

11. A process according to claim 10 wherein the amount of said anionic polymer added in step (d) is about 0.3 to about 0.5 mg/l.

12. A process according to claim 1 wherein said mixture of ash and regenerated adsorbent particles is produced by wet oxidation of a mixed liquor sludge recovered from a wastewater treatment system.

13. A process according to claim 1 wherein said mixture of ash and regenerated adsorbent particles is produced by thermal regeneration of a mixed liquor sludge recovered from a wastewater treatment system.

14. A process according to claim 1 wherein said regenerated adsorbent particles are carbon.

15. A process for separating ash particles from a mixture of ash and regenerated carbon particles recovered from a wastewater treatment system and contained in an aqueous slurry, said process comprising (a) settling said aqueous slurry to produce a clarified first aqueous phase containing about 50 to about 80% by volume of the total water in said slurry and a thickened first solids phase;

(b) separating said first aqueous phase from said first solids phase;

(c) adding substantially clean water to said separated first solid phase to obtain a dilution ratio of about 2 to about 5 parts of water by volume to one part of said first solids phase;

(d) admixing with said diluted first solids phase about 5 to about 500 mg/l of a dispersing agent for promoting suspension of said ash particles and about 0.1 to about 4 mg/l of an anionic polymer for promoting settling of said carbon particles;

(e) settling said thus-treated first solids phase to produce a second aqueous phase containing primarily suspended ash particles and a settled second solids phase containing primarily carbon particles;

(f) separating said second aqueous phase from said second solids phase; and (g) recycling said second solids phase to said treatment system.

16. A process according to claim 15 wherein the amount of said dispersing agent added in step (d) is about 10 to about 100 mg/l.

17. A process according to claim 16 wherein the amount of said dispensing agent added in step (d) is about 40 mg/l.

18. A process according to claim 15 wherein the amount of said anionic polymer added in step (d) is about 0.3 to about 0.5 mg/l.

19. A process according to claim 15 wherein said mixture of ash and regenerated carbon particles is produced by wet oxidation of a mixed liquor sludge recovered from said treatment system.

20. A process according to claim 15 wherein said mixture of ash and regenerated carbon particles is produced by thermal degradation of a mixed liquor sludge recovered from said treatment system.

21. A process for separating ash particles from a mixture of ash and regenerated carbon particles recovered from a wastewater treatment system and contained in an aqueous slurry, said process comprising (a) settling said aqueous slurry to produce a clarified first aqueous phase containing about 50 to about 80% by volume of the total water in said slurry and a thickened first solids phase;

(b) separating said first aqueous phase from said first solids phase;

(c) adding substantially clean water to said separated first solids phase to obtain a dilution ratio of about 2 to about 5 parts of water by volume to one part of said first solids phase;

(d) admixing with said diluted first solids phase about 5 to about 500 mg/l of a dispersing agent for promoting suspension of said ash particles and about 0.1 to about 4 mg/l of an anionic polymer for promoting settling of said carbon particles;

(e) settling said thus-treated first solids phase to produce a second aqueous phase containing primarily suspended ash particles and a settled second solids phase containing primarily carbon particles;

(f) separating said second aqueous phase from said second solids phase;

(g) adding substantially clean water to said separated second solids phase to obtain a dilution ration of 2 to about 5 parts of water by volume to 1 part of said second solids phase;

(h) admixing with said dilute second solids phase about 5 to about 500 mg/l of a dispersing agent for promoting suspension of said ash particles and about 0.1 to about 4 mg/l of an anionic polymer for promoting settling of said carbon particles;

(i) settling said thus-treated, dilute second solids phase to produce a third aqueous phase containing primarily suspended ash particles and a settled third solids phase containing primarily carbon particles;

(j) separating said third aqueous phase from said third solids phase; and (k) recycling said third solids phase to said treatment system.

* * * * *

UNITED STATES PATENT AND TRADEMARK OFFICE
CERTIFICATE OF CORRECTION

PATENT NO. : 4,778,598

DATED : October 18, 1988

INVENTOR(S) : Mark C. Hoffman, Marvin J. Dietrich, Thomas P. Oettinger

It is certified that error appears in the above-identified patent and that said Letters Patent is hereby corrected as shown below:

In Column 8, line 11, "dispensing" should be --dispersing--.

Signed and Sealed this

Eighteenth Day of April, 1989

Attest:

DONALD J. QUIGG

*Attesting Officer*  *Commissioner of Patents and Trademarks*